March 24, 1931.  M. J. NAPIER  1,797,439
FLUID TRANSMISSION
Filed June 8, 1928　　3 Sheets-Sheet 1

INVENTOR.
MELVIN J. NAPIER.
BY Ely & Barrow
ATTORNEYS

March 24, 1931.  M. J. NAPIER  1,797,439
FLUID TRANSMISSION
Filed June 8, 1928  3 Sheets-Sheet 3

INVENTOR
MELVIN J. NAPIER
BY
ATTORNEYS.

Patented Mar. 24, 1931

1,797,439

UNITED STATES PATENT OFFICE

MELVIN J. NAPIER, OF AKRON, OHIO

FLUID TRANSMISSION

Application filed June 8, 1928. Serial No. 283,837.

The present invention relates to a device for transmitting power from a driving to a driven shaft and for regulating the ratio of speed between the two shafts. The device provides for a means of transmitting power through the circulation of a fluid, either oil or water, through the device, the rate of speed being determined by the rate at which the fluid is permitted to circulate through the device. This result is accomplished by turning the driving shaft and associated driving elements, thereby forcing the fluid from one chamber into another chamber containing driven elements carried by the driven shaft, said chamber being separated and partially defined by a member movable with the driven shaft. The chamber containing the driven elements is divided into a plurality of compartments, one, two, or all of which may be employed selectively to receive the fluid from the other chamber, thus varying the effective capacity of the chamber and consequently the speed of rotation of the driven shaft. If no fluid is passed from one chamber to the other, the driving and driven shafts will rotate in unison. As the number of compartments utilized is increased, the speed of rotation of the driven shaft is reduced. If a by-pass is opened through the unit the fluid impelled by the driving shaft is permitted to pass entirely through the unit without inducing any rotation of the driven shaft.

With the foregoing brief statement of the objects and general operation of the device, the detailed description of the apparatus will be clear, it being sufficient to state that the details of the device as shown here may be altered or modified within the scope of the invention, and such modifications or improvements as are within the broad range of the claims are intended to be covered herein.

In the drawings, in which one form of the invention is shown:

Figure 2:
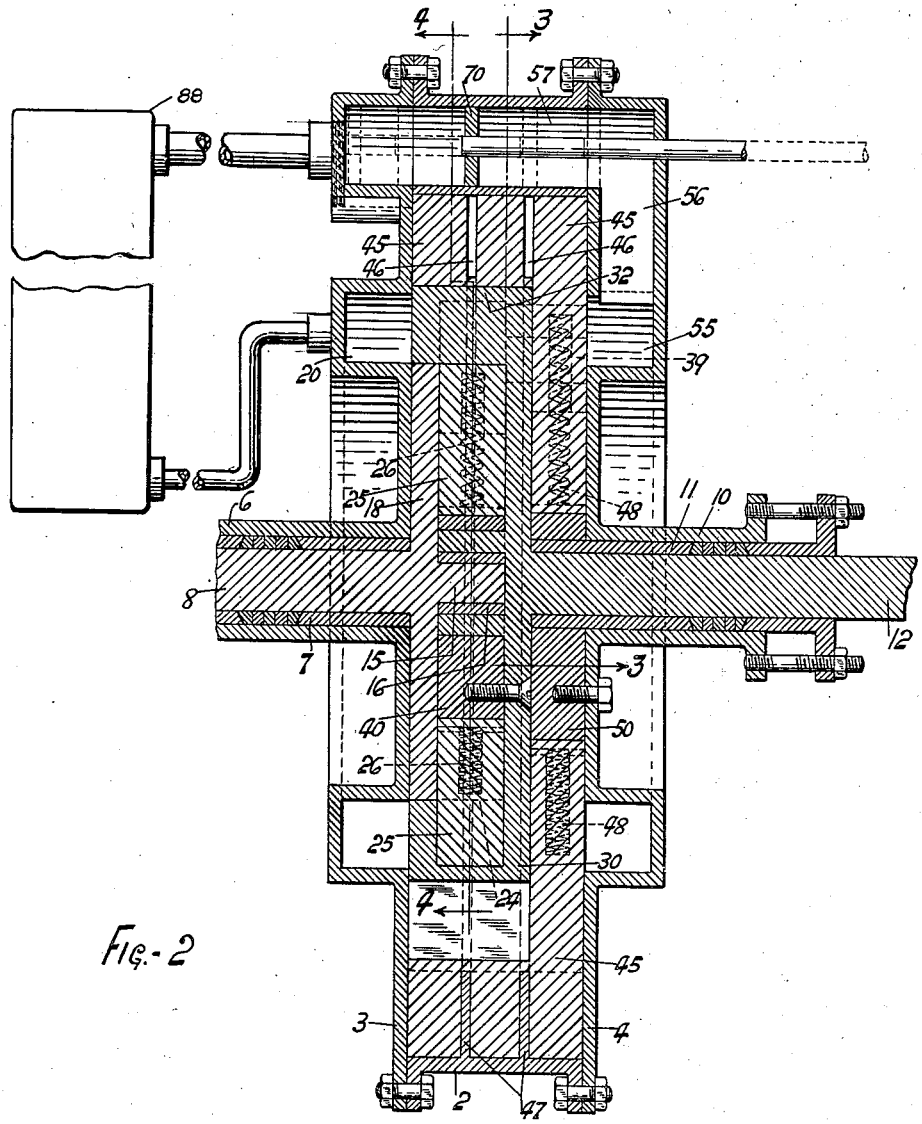
Figure 2 is a section on the line 2—2 of Figure 1.

The transmission consists of a casing which is circular in side view and is provided with a central circular housing 2 to which are attached end plates 3 and 4, as seen in Figure 2, the former is on the left or driving side of the transmission and the latter is on the right or driven side thereof. The several parts of the casing are connected so as to be fluid tight, and the plate 3 is formed with an axial sleeve 6 in which is a bearing 7 for the driving shaft 8. The plate 4 is formed with a sleeve 10 located in alignment with the sleeve 6, and having a bearing 11 for the driven shaft 12. Both bearings are packed so as to retain the fluid within the transmission. The shaft 8 is provided with a reduced extension 15 received in a bearing 16 located in the end of the shaft 12.

Formed upon the shaft 8 against the plate 3 is a disk or flange 18, the circumference of which substantially coincides with the inner wall of a channel 20 formed in the plate 3. This channel is provided with an inlet port 21 which receives the oil, water or other circulating fluid used in the transmission. It is desirable that the fluid be passed through a radiator or cooling device 88 outside of the transmission so as to keep it at a stable temperature during the operation of the transmission.

The disk 18 is formed upon its rear face with a flange 24 in which are slidably mounted a plurality of radial vanes or blades 25 which are moved inwardly by coil springs 26 seated in the flange and bearing against heads 27 on the blades.

The shaft 12 is provided with a hub 30 spaced from the flange 18 and having a flange 32 surrounding the disk 18 and its flange 24. The inner face of the flange 32 is cut away to provide a chamber 35 on the inside of the flange 32, this chamber being continuous except at one point where there is provided the baffle or abutment 36 which divides the chamber. The outer side wall of the chamber 35 is closed except where an inlet port 38 is located in register with the channel 20. The inner side wall of the chamber is provided with an outlet port 39 which leads from the chamber 35 to the rear face of the hub 30. The inlet and outlet ports are located on opposite sides of the baffle 36.

In the operation of the transmission, as the driving shaft is rotated the blades are projected into the chamber 35 and thereby circulate the transmission fluid therethrough and out through the port 39. The blades 25 are projected by means of a cam 40 which is attached to the hub 30, the shape of the cam permitting the blades to withdraw, under action of the springs 26, as they approach the baffle 36.

Supported on the hub 30 are a plurality of vanes or blades 45 which are substantially L-shaped in outline, the outer extremities of the blades being substantially the width of the casing 2 and being provided with deep notches 46 which receive webs or partitions 47 extending inwardly from the casing 2, the partitions dividing the chamber between the hub 30 and the casing into a plurality of compartments. The blades 45 are moved inwardly by springs 48 and are moved outwardly by a stationary cam 50 attached to the side plate 4. The casing 2 is provided with a baffle or abutment 52 which divides the chamber 53 on the interior of the casing and in which the blades 45 operate, and the cam 50 is designed so that the blades are withdrawn as they approach the baffle 52 and extend on the opposite side thereof.

The outlet 39 discharges the liquid from the chamber 35 into the circular channel 55 on the end plate 4 from which it is delivered by passage 56 to the transverse passage or header 57 located in the baffle 52 and extending across the casing. The header 57 has a series of lateral discharge ports 58 which communicate with the several compartments of the chamber 53 formed by the partitions 47.

At the opposite side of the baffle are located the outlet ports 60 which communicate with the outlet chamber 62 on the side plate 3 from whence the liquid is transferred to the radiator and later returned to the transmission system.

Figure 1:
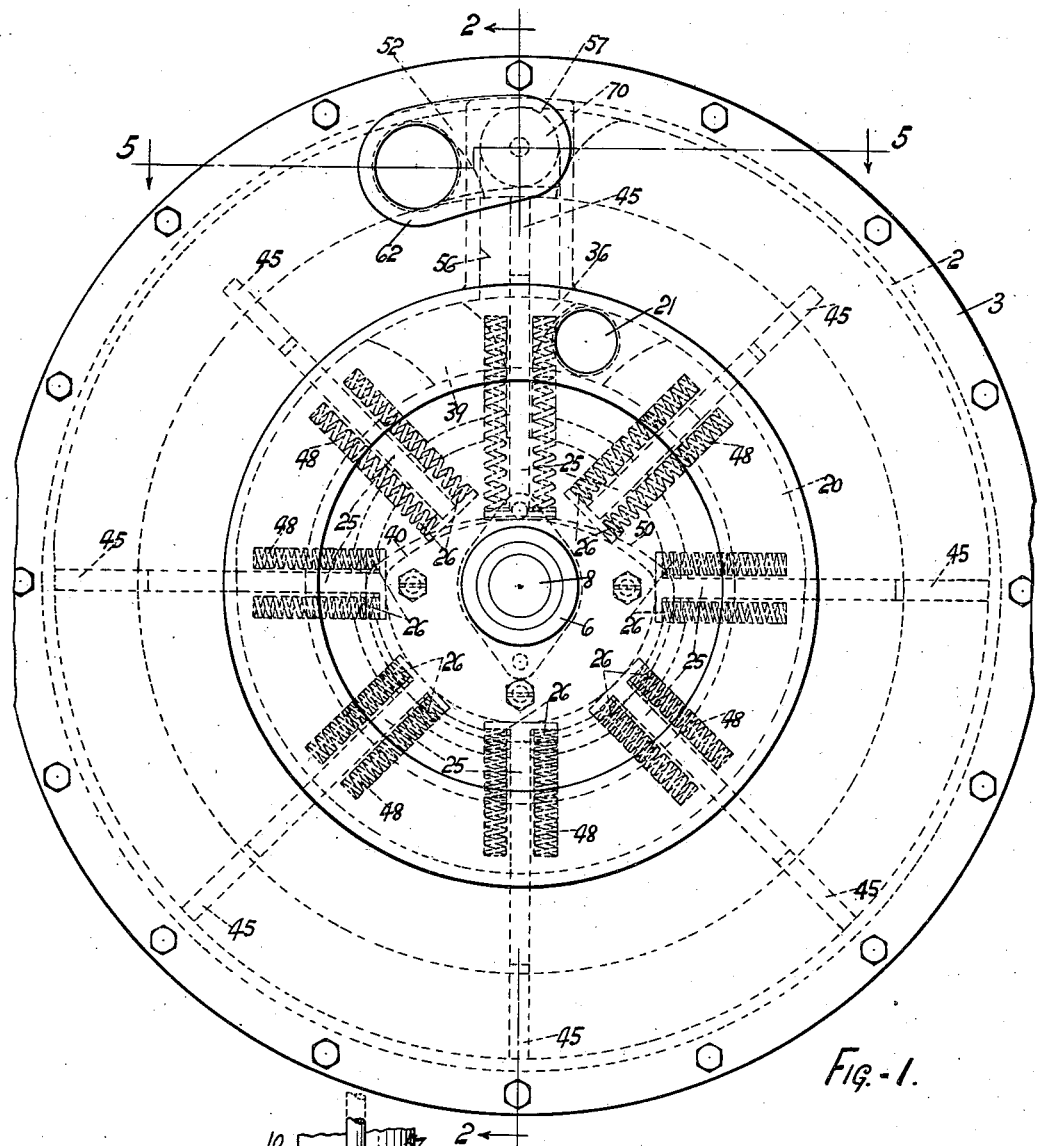
Figure 1 is a side elevation of the complete transmission.
Figure 5:
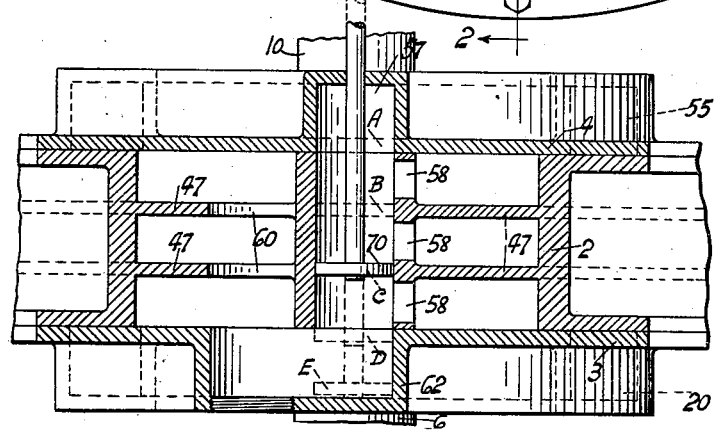
Figure 5 is a section on the line 5—5 of Figure 1.

In the header 57 is located a sliding piston 70 by means of which the ratio of power transmission is adjusted and determined. This piston 70 is movable from a position closing the passageway 56 to a position in the chamber 62 and is adapted to be placed between any of the ports 58, as shown in dotted lines in Figure 5. It will be understood that the control device may be located at a point remote from the transmission, suitable piping being employed to accomplish the same result.

Figure 3:
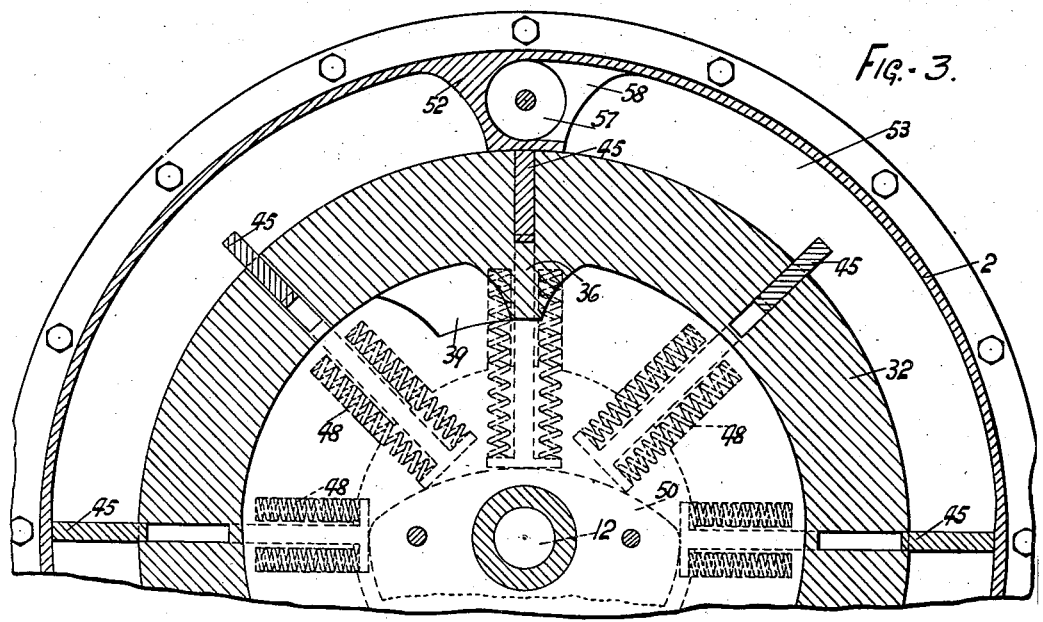
Figure 3 is a section of the upper half of the transmission on the line 3—3 of Figure 2.
Figure 4:
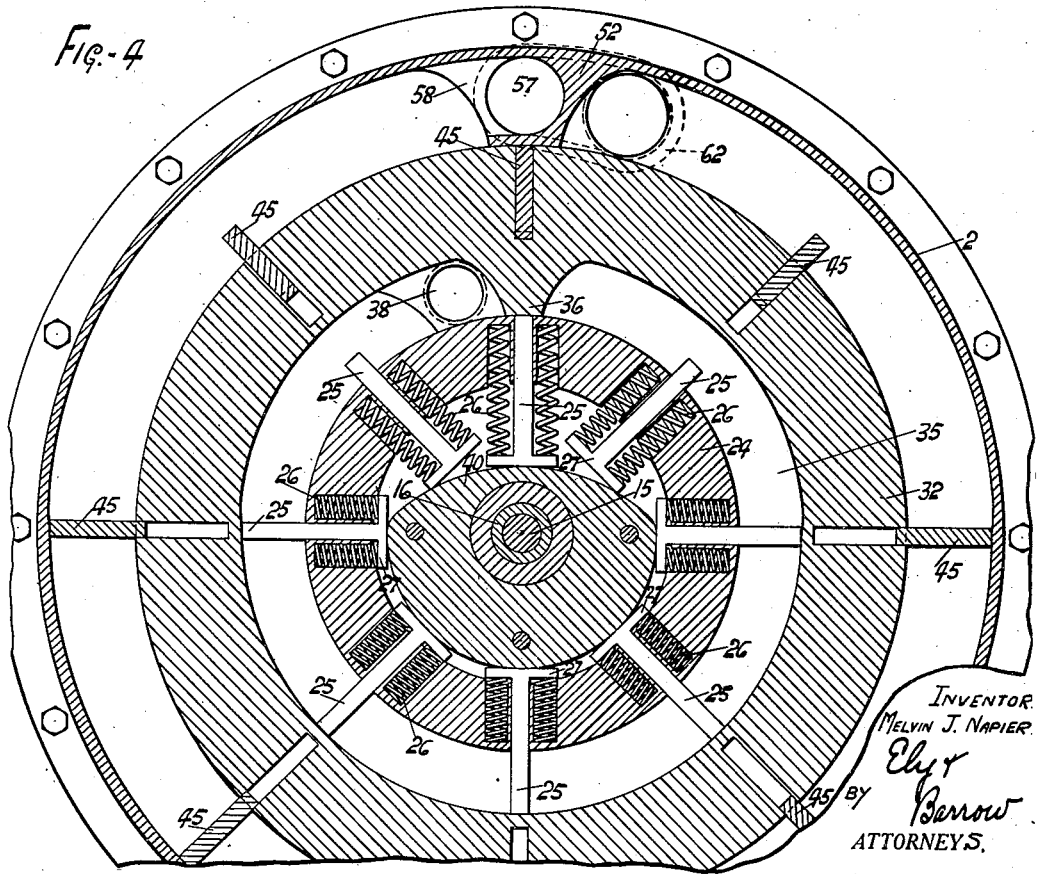
Figure 4 is a similar section on the line 4—4 of Figure 2.

If desired, the inner wall of the casing may be relieved to a certain extent on either side of the ports in both the driving and driven sides of the unit, the purpose of which is to relieve the pressure upon the blades and permit them to be freely operated by the springs. This is shown in the drawings, particularly in Figures 3 and 4.

The operation of the transmission will now be described. If the piston 70 is located at the point A (Figure 5), none of the liquid impelled by the blades carried upon the driving shaft can circulate through the apparatus and none can therefore escape. This compels the driving shaft and the driven shaft to rotate in unison through the entrapped fluid. If the piston is moved to B position, the first of the ports 58 is uncovered and the blades 45 permit the liquid to escape through the outlet 60. As the piston is moved to C and D positions, a greater volume or capacity of the blades 45 is provided so that the flow of liquid through the transmission is increased, and, as a result, slower rotation of blades and consequently of the driven shaft will permit escape of the fluid impelled by the driving shaft. If the piston is moved to E position, all of the fluid will circulate directly through the passageway 57 and no rotation will be transmitted to the driven shaft, as the blades 45 are then inoperative.

It will be apparent from the foregoing description that the socket forming flange on the end of the driven shaft not only forms the chamber about the vanes of the driving shaft, but also serves to carry the vanes of the driven shaft. Thus it is a necessary part of both the driving and the driven units.

What is claimed is:

1. A transmission having an enclosed fixed casing, a driving shaft rotatable in the casing, said casing having an annular channel on both sides thereof, a fluid inlet to one of said channels, a fluid impelling device attached to the driving shaft, an outlet in the other of said channels, a driven shaft in the casing, the ends of said shafts being journaled one in the other, vanes carried by the driven shaft and rotatable by the fluid impelled by the driving shaft on its way to the outlet, positive means to close or open the outlet, and a radiator for cooling the fluid connected between the outlet and the inlet.

2. A transmission having an enclosed fixed casing, a driving shaft rotatable in the casing, said casing having an annular channel on both sides thereof, a fluid inlet to one of said channels, fluid impelling vanes attached to the driving shaft, an outlet in the other of said channels, a driven shaft in the casing, vanes carried by the driven shaft and rotatable by the fluid impelled by the driving shaft on its way to the outlet, said casing containing partitions dividing the vanes into a plurality of areas, and positive means to close or open the outlet and simultaneously vary the effective area of the last-named vanes.

3. A transmission comprising a housing divided into two compartments, a driving shaft having vanes thereon rotating in one compartment, a driven shaft having vanes thereon rotating in the other compartment, partitions for dividing the effective area of the last-named vanes, a fluid inlet to the first compartment, a passage from the first compartment to the second compartment, said passage having a plurality of ports discharging into the spaces between the partitions and means to vary the number of effective ports, and an outlet from the second compartment.

4. A transmission comprising a housing divided into two compartments, a driving shaft having vanes thereon rotating in one compartment, a driven shaft having vanes thereon rotating in the other compartment, partitions for dividing the effective area of the last-named vanes, a fluid inlet to the first compartment, a passage from the first compartment to the second compartment, said passage having a plurality of ports discharging into the spaces between the partitions and means to vary the number of effective ports, and an outlet from the second compartment, said passageway being communicable directly with the outlet if desired.

5. In a transmission device, a driving shaft having a flanged end, a plurality of radially moving vanes adapted to slide in slots in the flanged end of the driving shaft, a driven shaft having a socket member formed integrally with the end thereof, said socket member surrounding the flanged end of the driving shaft and having integral abutments on the inner surface of the socket cooperating with said vanes, a fixed cam plate controlling said vanes, a plurality of additional vanes radially slidable in slots in the outer periphery of said socket member, a fixed casing surrounding the entire unit, said casing having abutments on its inner surface cooperating with said additional vanes, a second cam plate controlling the movements of said additional vanes, and means for positively controlling the flow of liquid from between the first-named vanes and abutments to the last-named vanes and abutments.

6. In a transmission device, a driving shaft having a flanged end, a plurality of radially moving vanes adapted to slide in slots in the flanged end of the driving shaft, a driven shaft having a socket member formed integrally with the end thereof, said socket member surrounding the flanged end of the driving shaft and having integral abutments on the inner surface of the socket cooperating with said vanes, a fixed cam plate controlling said vanes, a plurality of additional vanes radially slidable in slots in the outer periphery of said socket member, a fixed casing surrounding the entire unit, said casing having abutments on its inner surface cooperating with said additional vanes, a second cam plate controlling the movements of said additional vanes, each additional vane having a plurality of notches at its outer end, and said casing having a plurality of partitions cooperating with said notches to form a plurality of compartments, and means for positively controlling the flow of liquid from between the first-named vanes and abutments to the last-named vanes and abutments.

7. A transmission device, including a driving and a driven shaft, vanes on the driving shaft, a member integral with the driven shaft adapted to form a compartment about said vanes and having abutments thereon cooperating with said vanes, additional vanes extending outwardly on said member, a casing adapted to form a compartment about said last-named vanes, abutments on the casing to cooperate with the last-named vanes, partitions in said casing adapted to divide the last-named compartment into a plurality of smaller compartments to vary the effective area of said last-named vanes, and means to positively control the flow of liquid from the first compartment to any desired number of the smaller compartments, whereby the gear ratio of the device is controlled.

8. A transmission device, including a driving and a driven shaft, vanes on the driving shaft, a member integral with the driven shaft adapted to form a compartment about said vanes and having abutments thereon cooperating with said vanes, additional vanes extending outwardly on said member, a casing adapted to form a compartment about said last-named vanes, abutments on the casing to cooperate with the last-named vanes, means for positively controlling the flow of liquid from the first compartment to the second, a pair of axially positioned cam plates for controlling the movement of said vanes, and balanced spring means for holding each of said vanes against said cam plates.

9. A transmission comprising a fixed housing, a socket member dividing said housing into two compartments, a driving shaft having vanes thereon rotating in one compartment and a driven shaft fixed to said socket member, said socket member surrounding said vanes and cooperating therewith, said socket member having vanes thereon adapted to rotate in the other compartment, said last-named vanes being variable as to effective areas, a passageway between the compartments, a fluid inlet for the first-named compartment, an outlet for the second-named compartment, and means for regulating the amount of fluid delivered by the passageway to the second compartment.

10. A transmission comprising a fixed housing, a socket member dividing said housing into two compartments, a driving shaft having vanes thereon rotating in one compartment and a driven shaft fixed to said socket member, said socket member surrounding said vanes and cooperating therewith, said socket member having vanes thereon rotating in the other compartment, a passageway between the compartments, a fluid inlet for the first-named compartment, an outlet for the second-named compartment, and means for regulating the amount of fluid delivered by the passageway to the second compartment or for shutting off the flow to the second compartment.

11. A transmission comprising a housing, a socket member dividing said housing into two compartments, a driving shaft having vanes thereon rotating in one compartment and a driven shaft fixed to said socket member, said socket member surrounding said vanes and cooperating therewith, said socket member having vanes thereon rotating in the other compartment, partitions dividing the effective area of the last-named vanes, a passageway from the first compartment, a header connecting with the passageway and extending across the second compartment, a plurality of ports in said header opening between said partitions, a discharge outlet with which the header and the second compartment are in communication, and a valve movable in the header and adapted to vary the number of effective ports.

MELVIN J. NAPIER.